US012759503B2

(12) United States Patent
Harms et al.

(10) Patent No.: US 12,759,503 B2
(45) Date of Patent: Oct. 13, 2026

(54) BELT RETRACTOR FOR A SAFETY BELT OF A MOTOR VEHICLE

(71) Applicant: Autoliv Development AB, Vargarda (SE)

(72) Inventors: Fabian Harms, Hamburg (DE); Martin Kühn, Elmshorn (DE); Torsten Jung, Elmshorn (DE)

(*) Notice: Subject to any disclaimer, the term of this patent is extended or adjusted under 35 U.S.C. 154(b) by 69 days.

(21) Appl. No.: 18/873,967

(22) PCT Filed: May 31, 2023

(86) PCT No.: PCT/EP2023/064492
§ 371 (c)(1),
(2) Date: Dec. 11, 2024

(87) PCT Pub. No.: WO2023/241909
PCT Pub. Date: Dec. 21, 2023

(65) Prior Publication Data

US 2025/0360890 A1 Nov. 27, 2025

(30) Foreign Application Priority Data

Jun. 13, 2022 (DE) ..................... 10 2022 114 835.1

(51) Int. Cl.
*B60R 22/34* (2006.01)
*B60R 22/28* (2006.01)

(52) U.S. Cl.
CPC ........ *B60R 22/34* (2013.01); *B60R 2022/287* (2013.01); *B60R 2022/3427* (2013.01)

(58) Field of Classification Search
CPC . B60R 22/34; B60R 22/341; B60R 2022/287; B60R 2022/3427
See application file for complete search history.

(56) References Cited

U.S. PATENT DOCUMENTS 5,967,441 A * 10/1999 Kohlndorfer ....... B60R 22/3413 242/379.1
5,984,223 A * 11/1999 Hiramatsu .......... B60R 22/4676 297/480
6,405,962 B1 * 6/2002 Hirase ................. B60R 22/3413 280/805
8,955,783 B2 2/2015 Klafke
2015/0210247 A1 7/2015 Li

FOREIGN PATENT DOCUMENTS

DE 10 2009 037 176 A1 2/2011

* cited by examiner

*Primary Examiner* — Sang K Kim
(74) *Attorney, Agent, or Firm* — Dickinson Wright, PLLC

(57) ABSTRACT

The invention relates to a belt retractor for a seat belt of a motor vehicle, comprising: a belt shaft which is rotatably mounted in a housing frame, wherein the belt shaft comprises an exit slot; a belt webbing, wherein one end of the belt webbing is fastened in the belt shaft and the belt webbing is guided out of the belt shaft through the exit slot; a profile head which can be locked in relation to the housing frame; and a force-limitation device which is at least in part arranged in the belt shaft, wherein the belt webbing abuts the force-limitation device in the circumferential direction for 180° or more, wherein the force-limitation device has multiple stages.

19 Claims, 4 Drawing Sheets

BELT RETRACTOR FOR A SAFETY BELT OF A MOTOR VEHICLE

The present invention relates to a belt retractor for a seat belt of a motor vehicle, the belt retractor comprising a belt shaft which is rotatably mounted in a housing frame, wherein the belt shaft comprises an exit slot, a belt webbing, wherein one end of the belt webbing is fastened in the belt shaft and the belt webbing is guided out of the belt shaft out of the exit slot, a profile head which can be locked in relation to the housing frame and a force-limitation device which is at least in part arranged in the belt shaft, wherein the belt webbing abuts the force-limitation device in the circumferential direction for 180° or more.

Such a belt retractor is known, for example, from DE 10 2009 037 176 A1. This belt retractor has an end loop at the end of the belt webbing into which a torsion bar is inserted as an element of the force-limitation device. The end loop of the belt webbing is therefore directly attached to the torsion bar. By wrapping the torsion bar for 180°, an even load introduction is ensured. With the belt retractor known from DE 10 2009 037 176 A1, a force-limited belt webbing extension is only possible with one step, during which the torsion bar is twisted.

The object of the present invention is to provide a belt retractor in which the force-limited belt webbing extension can take place at several levels, wherein at the same time the belt shaft has a high breaking load.

The object is achieved by a belt retractor with the features of the independent claim. Advantageous developments of the belt retractor are specified in the dependent claims and in the description, wherein it is possible for individual features of the advantageous developments to be combined with one another in a technically expedient manner.

The object is achieved in particular by a belt retractor with the features mentioned at the outset, in which the force-limitation device has multiple stages.

In other words, the basic idea of the invention is that, in a belt retractor with a force-limitation device having multiple stages, the belt webbing abuts the force-limitation device in the circumferential direction for 180° or more. Preferably, the belt webbing abuts the force-limitation device in the circumferential direction for more than 180°, for example for more than 185° or more than 190°. This high wrap angle ensures that during force-limited belt webbing extension there is an even load distribution, in particular in the longitudinal direction of the belt shaft. With an even load distribution, the belt shaft can be optimized to achieve a high breaking load. In particular, it can thus be achieved that the belt shaft is designed with a maximum thickness over the largest possible circumferential angle, even if a force-limitation device having multiple stages is arranged inside the belt shaft.

In a preferred embodiment, the force-limitation device comprises a sleeve arranged in the belt shaft, wherein the sleeve is connected to the belt shaft for conjoint rotation and wherein the belt webbing abuts an outer side of the sleeve. The belt webbing is thus guided out of the belt shaft through the exit slot and arranged inside the belt shaft between an outer side of the sleeve and the inner side of the belt shaft. The belt webbing abuts the sleeve in the circumferential direction for 180° or more. The belt webbing does not therefore act directly on the force-limitation elements, which are designed as torsion bars, for example, but on a rigid sleeve which, in particular in the initial state, is connected in a suitable manner to the belt shaft for conjoint rotation and on the outer side of which the belt webbing is wound. In particular, the belt webbing abuts an outer side of the sleeve in the circumferential direction for more than 180° and less than 225°. It can be provided that the connection of the sleeve to the belt shaft for conjoint rotation is released by means of the switching apparatus, so that after the switching process the belt shaft executes a rotational movement relative to the sleeve via at least one torsion bar during the force limitation.

In a preferred embodiment, the force-limitation device comprises at least two, preferably exactly two or exactly three torsion bars, which are arranged at least in sections in the belt shaft and preferably in the sleeve. Depending on the coupling of the torsion bars, different levels can be provided during the force-limited belt webbing extension, depending on whether one of the two torsion bars or both torsion bars is/are coupled to the housing frame during the force-limited belt extension.

In order to switch between the force-limitation levels during the force-limited belt webbing extension, a switching apparatus is proposed which can be used to switch between the stages of the force-limitation device. Force-limitation devices with several force-limitation levels and related switching apparatuses are known from the prior art as such, but not in conjunction with a belt webbing that wraps around the force-limitation device by more than 180°.

In particular, one end of each torsion bar is connected to the belt shaft for conjoint rotation or, if necessary, can be connected by means of the switching apparatus. It can also be provided that at least one end of at least one torsion bar is connected to the profile head for conjoint rotation. The coupling of the at least one torsion bar to the housing frame can therefore preferably be carried out by means of the profile head, for which purpose at least one torsion bar is or can be connected to the profile head for conjoint rotation on the one hand and to the belt shaft for conjoint rotation on the other hand. During the force-limited relative rotation, the end of the torsion bar connected to the profile head would thus be coupled to the housing frame for conjoint rotation.

In a preferred embodiment, it is proposed that the end of the belt webbing forms an end loop into which a rod element is inserted, so that the end of the belt webbing is fastened in the belt shaft. Thus, the force-limitation device is not arranged in the end loop itself. In this context, in particular, the belt shaft comprises a belt webbing end holder in which the rod element and thus the end loop of the belt webbing is fastened.

In a preferred embodiment, the exit slot and the belt webbing end holder are spaced apart in the circumferential direction, in which the belt webbing wraps around the force-limitation device, by more than 220°. The distance is measured on the outer circumferential surface of the belt shaft. The distance between the belt webbing end holder and the exit slot should not be more than 300°, preferably not more than 270°. This distance ensures that the belt webbing wraps around the force-limitation device inside the belt shaft for more than 180°. The exit slot and the belt webbing end holder are arranged on the same side of the belt shaft. In this context, it is also provided in particular that, in addition to the exit slot, the belt shaft comprises exclusively the belt webbing end holder as recesses that extend from an outer side of the belt shaft to an inner side of the belt shaft. Apart from the belt webbing end holder and the exit slot, there is no recess in the belt shaft that extends from the inside to the outer side.

The exit slot and the belt webbing end holder are also in particular arranged and designed such that they are spaced apart from each other in the circumferential direction by at least 45°, preferably at least 60°, but not more than 70° on the inner side of the belt shaft, namely in the region in which the belt does not abut the force-limitation device. This means that there is still a relatively large region where the sleeve of the force-limitation device can directly abut the inner side of the belt shaft, at least in the case of a load.

In a preferred embodiment, a height of the exit slot is between 200% and 500% of a thickness of the belt webbing. In particular, the height is between 250% and 300% of the thickness of the belt webbing. The height is to be determined at right angles to the belt webbing plane within the exit slot.

The exit slot is in particular arranged such that it extends parallel to a tangent of an inner side of the belt shaft, which is (imaginarily) laid out in a region in which the exit slot pierces the inner side of the belt shaft. It can also be provided that a stage is formed from the transition of the exit slot to the inner side of the shaft. The direction of extension of the exit slot (along the direction of the belt webbing extension) is therefore tangential to a point on the inner side of the belt shaft at which the exit slot pierces an inner circumferential surface of the belt shaft.

The belt webbing abuts the force-limitation device and in particular the sleeve of the force-limitation device in a first circumferential region and in a second circumferential region adjoining the first circumferential region. In a preferred embodiment, the circumferential regions differ in that the belt shaft has a different thickness in the first circumferential region than in the second circumferential region. The thickness refers to the strength of the belt shaft in the radial direction. The thickness is therefore the difference between the outer radius and the inner radius at the relevant point on the belt shaft. The belt shaft therefore has different strengths.

The first circumferential region is also in particular characterized by the fact that the belt webbing is arranged in two layers therein. To form the end loop for receiving the rod element, the belt webbing extends over a specific distance, which preferably defines the first circumferential region, in two layers.

In a preferred embodiment, the thickness of the belt shaft in the second circumferential region is between 110% and 130% of the thickness of the belt shaft in the first circumferential region. The strength of the belt shaft can therefore be optimized so that it is as maximal as possible.

The thickness of the belt shaft does not have to change abruptly at one point, but can increase gradually. In this regard, the thickness of the belt shaft in the second circumferential region increases from the thickness of the belt shaft in the first circumferential region to a maximum thickness within the second circumferential region.

It is also preferred that the second circumferential region is shorter in the circumferential direction than the first circumferential region.

The exit slot and the belt webbing end holder are in particular spaced apart from one another in such a way that the sleeve abuts the belt shaft in a region in which the belt webbing does not abut the force-limitation device, at least in the case of a load. It is therefore possible that, in the case of a load, forces are introduced directly from the sleeve into the belt shaft. Since the sleeve extends over the entire length of the belt shaft, an even load distribution of the forces introduced into the belt shaft via the belt webbing and the sleeve can take place.

In this context, it is particularly preferred that the sleeve abuts the shaft in the circumferential direction over at least 45°, preferably over at least 60° but not more than 90°.

The invention and the technical environment are explained below by way of example with reference to the figures. Schematically, in the figures.

Figure 1:
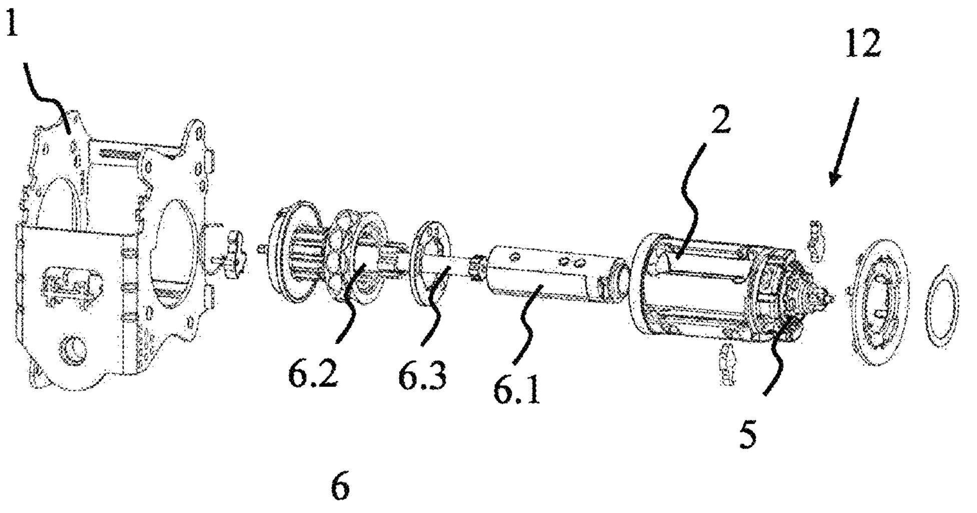
FIG. 1 is an exploded view of a belt retractor.

FIG. 1 shows a belt retractor which comprises a housing frame 1. A belt shaft 2 is rotatably mounted in the housing frame 1. The belt retractor also comprises a profile head 5, which can be locked in relation to the housing frame 1.

The belt retractor also comprises a force-limitation device 6, which in turn comprises a sleeve 6.1, a first torsion bar 6.2 and a second torsion bar 6.3.

The belt retractor also comprises a switching apparatus 12, with which it is possible to switch between force-limitation levels, which are predetermined by the torsion bars 6.2 and 6.3, during a force-limited relative rotation of the belt shaft 2 in relation to the housing frame 1. Such belt retractors are well known.

Figure 2:
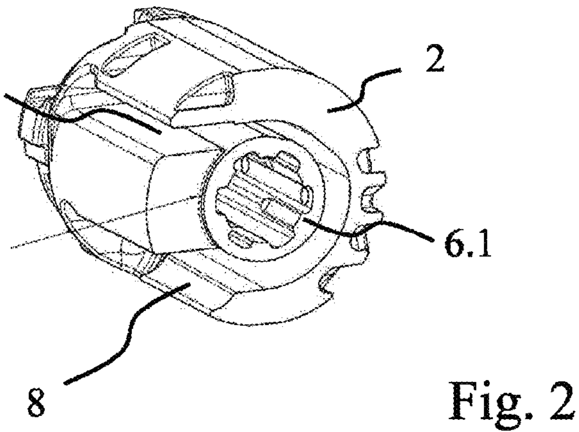
FIG. 2 is a perspective view of a belt shaft and a sleeve of the belt retractor.
Figure 3:
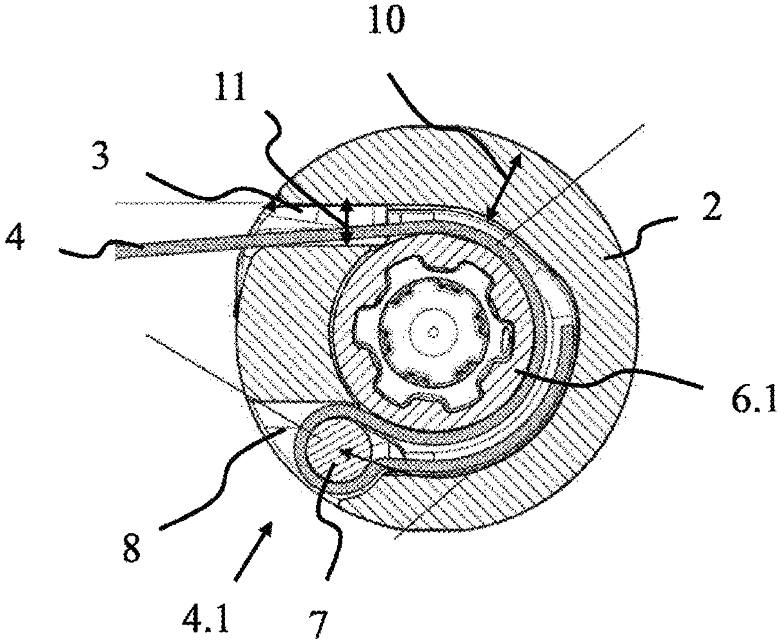
FIG. 3 is a sectional view through the belt shaft and the sleeve.
Figure 4:
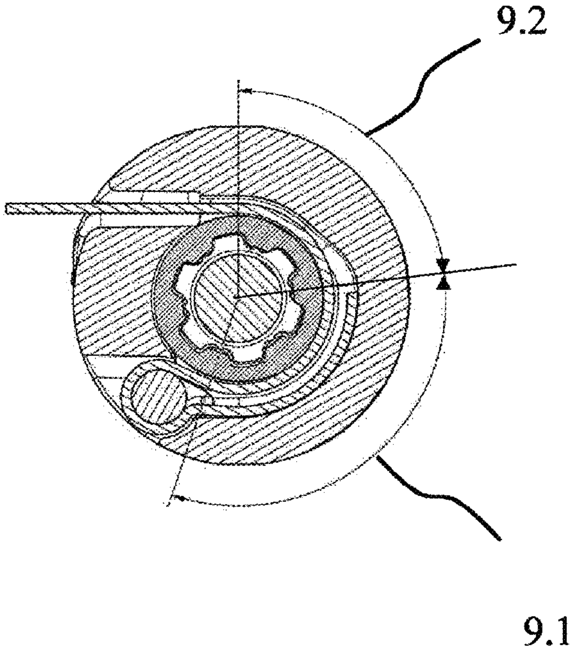
FIG. 4 is another sectional view through the belt shaft and the sleeve.

From FIGS. 2 to 4, it can be seen that the belt shaft 2 has an exit slot 3 with a height 11 and a belt webbing end holder 8.

A belt webbing 4 can be threaded through the belt webbing end holder 8 into the belt shaft 2, wherein the belt webbing 4 exits from the exit slot 3. After the end loop 4.1, into which a rod element 7 is inserted, has been pulled into the belt webbing end holder 8 and is thus fastened in the belt shaft 2, the belt webbing 4 is wound up on the belt shaft 2.

As can be seen in particular from FIG. 4, the belt webbing 4 abuts an outer side of the sleeve 6.1 in a first circumferential region 9.1 and in a second circumferential region 9.2. In the first circumferential region 9.1, the belt shaft 2 has a thickness which is less than a thickness of the belt shaft in the second circumferential region 9.2. The thickness corresponds to the strength of the belt shaft 2 and thus to the difference in radius between the outer circumference and the inner circumference of the belt shaft 2 at the relevant point. It can also be seen that the thickness 10 of the belt shaft increases starting from the first circumferential region 9.1 in the second circumferential region 9.2 toward the exit slot 3.

The thickness of the belt shaft 2 can thus be greater in the second region 9.2 than in the first region 9.1. Thus, despite the arrangement of two torsion bars inside the sleeve 6.1, a large thickness of the belt shaft 2 can be achieved. Since the sleeve 6.1 abuts the inner side of the shaft 2 over its entire length, an even load distribution over the length of the belt shaft 2 is possible.

In the case of a load exit slot and in particular at the end of the force limitation, the sleeve 6.1 comes to abut the inner side of the belt shaft 2, in a region in which the belt webbing 4 does not abut the sleeve 6.1. In this region, force is transmitted from the sleeve 6.1 to the belt shaft 2 during the force-limited belt webbing extension. Since the belt webbing 4 abuts an outer side of the sleeve 6.1 in the circumferential direction for more than 180°, the force is evenly introduced from the sleeve 6.1 into the belt shaft 2, so that the force is evenly distributed.

Figure 5:
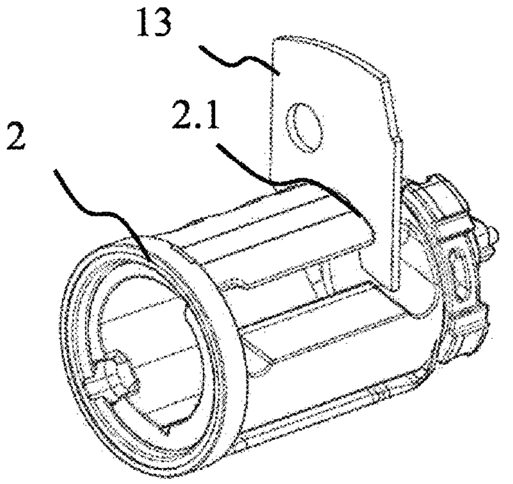
FIG. 5 shows a belt shaft with a transport lock.
Figure 6:
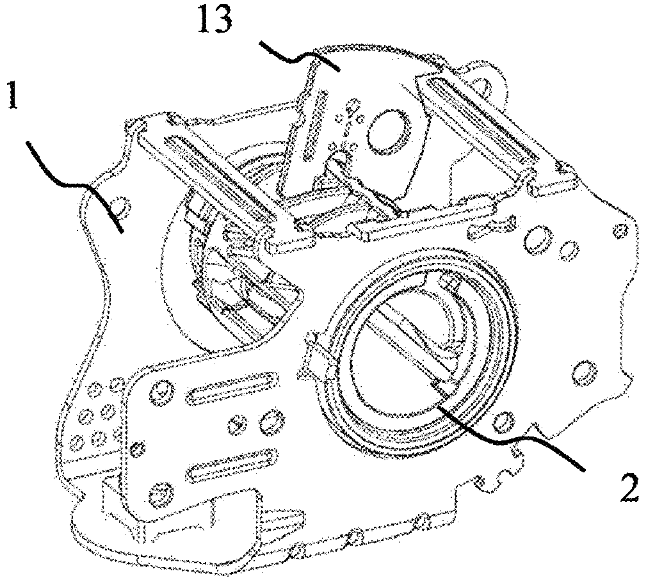
FIG. 6 shows another embodiment of a transport lock on a belt shaft.

FIGS. 5 and 6 show two embodiments of a transport lock 13. The transport locks 13 serve to secure the belt shaft 2 in the housing frame 1 against rotation between individual installation steps. Usually, after installing the belt retractor, the spring of the belt shaft 2 is tensioned and fixed with the transport lock 13. In a further installation step, the belt webbing 4 with the end loop 4.1 and the rod element 7 with its free end are inserted through the belt webbing end holder 8 until the end loop comes to abut in the belt webbing end holder 8. The second end of the belt webbing 4 emerges from the exit slot 3 and is subsequently rolled up onto the belt shaft 2 by the spring tension of the tensioned spring after the transport lock 13 has been released. In accordance with the first embodiment in FIG. 5, a gap is formed in the belt shaft 2, into which the transport lock 13 is inserted. The transport lock 13 in accordance with FIG. 6, however, is plugged onto the belt shaft 2 and has a recess at its upper end facing away from the belt shaft 2, which, when inserted, comes to abut an element of the housing frame 1.

LIST OF REFERENCE SIGNS

1 Housing frame
2 Belt shaft
2.1 Recess
3 Exit slot
4 Belt webbing
4.1 End loop
5 Profile head
6 Force-limitation device
6.1 Sleeve
6.2 First torsion bar
6.3 Second torsion bar
7 Rod element
8 Belt webbing end holder
9.1 First circumferential region
9.2 Second circumferential region
10 Thickness
11 Height
12 Switching apparatus
13 Transport lock

The invention claimed is:

1. A belt retractor for a seat belt of a motor vehicle, comprising
- a belt shaft which is rotatably mounted in a housing frame, wherein the belt shaft comprises an exit slot,
- a belt webbing, wherein one end of the belt webbing is fastened in the belt shaft and the belt webbing-is guided out of the belt shaft-through the exit slot,
- a profile head which can be locked in relation to the housing frame, and
- a force-limitation device which is at least in part arranged in the belt shaft, wherein
- the belt webbing abuts the force-limitation device-in the circumferential direction for 180° or more,
- the force-limitation device has multiple stages;
- the force-limitation device comprises a sleeve arranged in the belt shaft,
- the sleeve is connected to the belt shaft for conjoint rotation and is detachable; and
- the belt webbing abuts the sleeve.

2. The belt retractor according to claim 1, wherein the belt webbing abuts an outer side of the sleeve in the circumferential direction for more than 180° but less than 225°.

3. The belt retractor according to claim 1, wherein the sleeve abuts the belt shaft in a region in which the belt webbing does not abut the force-limitation device, at least in the case of a load.

4. The belt retractor according to claim 3, wherein the sleeve abuts the belt shaft in the circumferential direction over at least 45°.

5. The belt retractor according to claim 3, wherein the sleeve abuts the belt shaft in the circumferential direction over at least 60°.

6. The belt retractor according to claim 1, wherein the end of the belt webbing forms an end loop into which a rod element is inserted for fastening the end of the belt webbing in the belt shaft.

7. The belt retractor according to claim 1, wherein the belt shaft comprises a belt webbing end holder, wherein the exit slot and the belt webbing end holder are spaced apart from one another in the circumferential direction, in which the belt webbing also wraps around the force-limitation device, by more than 220°.

8. The belt retractor according to claim 1, wherein, in addition to the exit slot, the belt shaft comprises exclusively the belt webbing end holder as recesses that extend from an outer side of the belt shaft to an inner side of the belt shaft.

9. The belt retractor according to claim 1, wherein a height of the exit slot is between 200% and 500% of a thickness of the belt webbing.

10. The belt retractor according to claim 1, wherein the exit slot extends parallel to a tangent of an inner side of the belt shaft which is placed in a region in which the exit slot penetrates an inner side of the belt shaft.

11. The belt retractor according to claim 1, wherein the force-limitation device comprises at least two torsion bars that are arranged at least in sections in the belt shaft.

12. The belt retractor according to claim 11, wherein the force-limitation device comprises the at least two torsion bars arranged in the sleeve.

13. The belt retractor according to claim 1, wherein the belt retractor comprises at least one switching apparatus by means of which it is possible to switch between the stages of the force-limitation device.

14. The belt retractor according to claim 1, wherein the belt webbing abuts the force-limitation device in a first circumferential region and in a second circumferential region adjoining the first circumferential region.

15. The belt retractor according to claim 14, wherein the belt shaft includes a different thickness in the first circumferential region than in the second circumferential region.

16. The belt retractor according to claim 1, further comprising a sleeve abutting the belt shaft in a region where the belt webbing does not abut the sleeve and the force-limitation device, at least under load.

17. A belt retractor for a seat belt of a motor vehicle, comprising
- a belt shaft which is rotatably mounted in a housing frame, wherein the belt shaft comprises an exit slot,
- a belt webbing, wherein one end of the belt webbing is fastened in the belt shaft and the belt webbing-is guided out of the belt shaft-through the exit slot,
- a profile head which can be locked in relation to the housing frame, and
- a force-limitation device which is at least in part arranged in the belt shaft, wherein
- the belt webbing abuts the force-limitation device-in the circumferential direction for 180° or more,
- the force-limitation device has multiple stages;
- the belt webbing abuts the force-limitation device in a first circumferential region and in a second circumferential region adjoining the first circumferential region, and the belt shaft includes a different thickness in the first circumferential region than in the second circumferential region.

18. The belt retractor according to claim 17, wherein the thickness of the belt shaft in the second circumferential region is between 110% and 130% of the thickness of the belt shaft in the first circumferential region.

19. The belt retractor according to claim 17, wherein the second circumferential region is shorter in the circumferential direction than the first circumferential region.

* * * * *